M. HASKINS & D. B. HART.
CULTIVATOR.
No. 66,491. Patented July 9, 1867.
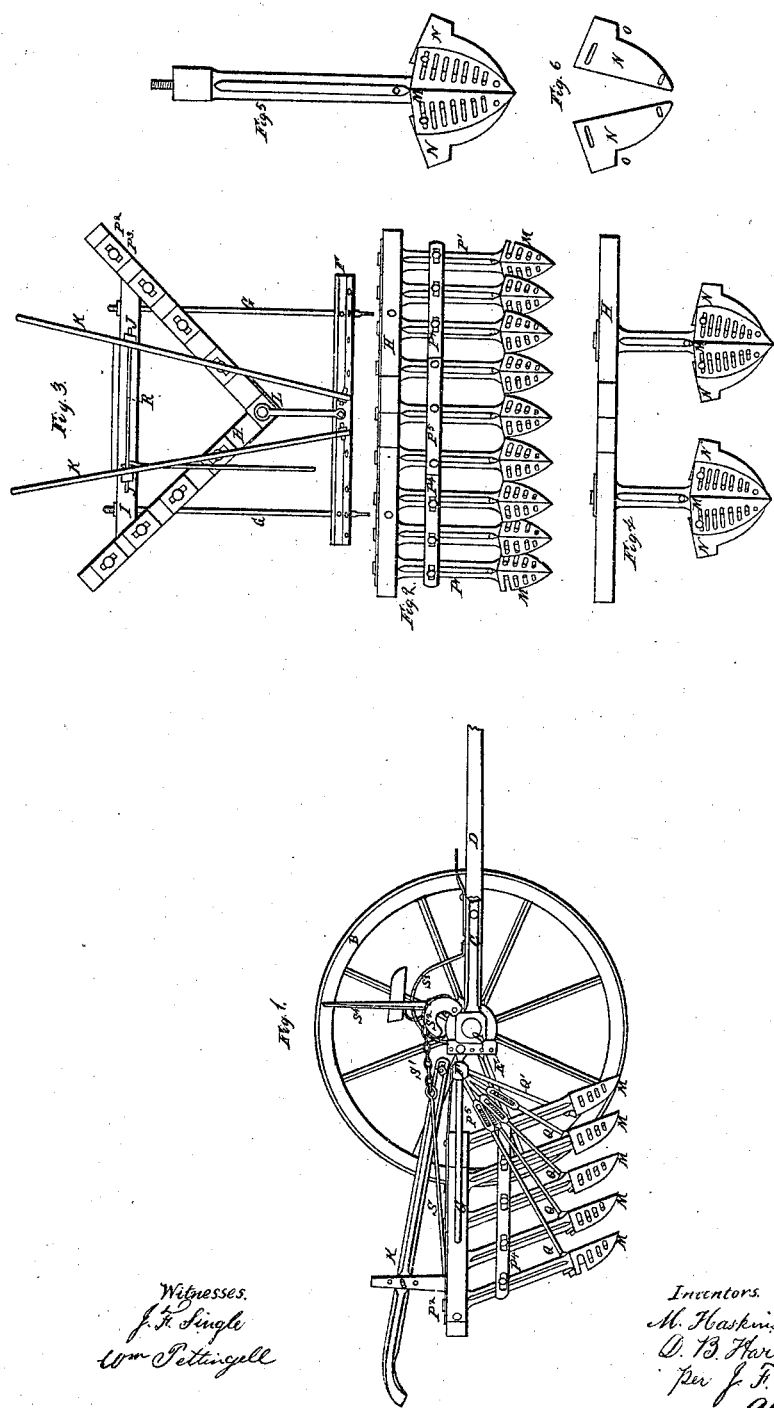

UNITED STATES PATENT OFFICE.

MARSHALL HASKINS AND D. B. HART, OF MENTOR, OHIO.

Letters Patent No. 66,491, dated July 9, 1867.

---

CULTIVATOR.

---

The Schedule referred to in these Letters Patent and making part of the same.

---

TO ALL WHOM IT MAY CONCERN:

Be it known that we, MARSHALL HASKINS and D. B. HART, both of Mentor, in the county of Lake, and State of Ohio, have invented certain improvements in Cultivators; and we do hereby declare that the following is a full and exact description thereof, reference being had to the accompanying drawings, in which—

Figure 1 is a side elevation of our improved cultivator, one wheel thereof being removed.

Figure 2 a front elevation of the angular beam and the shovels or ploughs attached thereto.

Figure 3 a top view of said angular beam, showing the manner of attaching it to the beam placed in rear of the axle-tree, and showing also the handles of the machine.

Figure 4 a front elevation in part of the arrangement of the cultivator when used for hilling potatoes, corn, &c.; and Figures 5 and 6 are front views of one of the perforated cultivator shovels or ploughs and the "blinds" used therewith, as will be explained.

The letters of reference marked thereon refer to similar parts in all the figures.

This invention relates to an improved cultivator for general purposes, such as for pulverizing and mellowing the ground preparatory to sowing small grain, and for harrowing in the same after sowing; for cultivating or stirring the soil and eradicating weeds, and for hoeing and hilling plants grown in hills or drills, all of which is done in a superior and efficient manner by means of the following improvements:

First. In the use of shovels or ploughs constructed with transverse perforations or interstices, and used with or without adjustable blinds, partially or wholly covering said interstices, as will be explained.

Second. The employment of a series or set of such ploughs arranged on a right-angled frame or beam, which is provided with slotted apertures for the lateral adjustment of the plough-standards, which standards are provided with adjustable braces, so as to be lengthened or shortened to accommodate the contracted or expanded position of said ploughs, according to the nature of the work or ground to be operated on.

Third. An arrangement whereby the handles which are used for guiding and holding the machine can be readily raised or lowered to suit a tall or short person; also, in the arrangement for regulating the penetration of the ploughs into the ground.

The following will enable those skilled in the art to understand and construct our said improved cultivator.

A, fig. 1, is an axle-tree mounted on a pair of wheels. B, C, and D are the commonly constructed hounds and tongue by which the machine is drawn. Attached to the said axle-tree is a pair of grooved clevis-plates, E, pierced with a set of holes, as seen. F, fig. 3, is a beam placed parallel with and just in rear of said axle-tree, to which it is attached by a pair of rods, G G, the ends of which rods are flattened and have holes through which bolts pass to secure them to the said clevis-plates, as seen in fig. 1. H, fig. 3, is a beam constructed of two pieces mortised at right angles, and which we term a right-angled beam. Said beam is provided with a series of slots, shown by the dotted lines in the said figure. It is strengthened in the rear by a cross-tie, I, mortised into it. A pair of standards, J J, erected on said tie, supports a pair of plough-shaped handles K K, the other ends of which articulate in joints on the beam F. The rods G G before mentioned pass in a parallel direction through the cross-tie I and right-angled beam H, securing said beam H to beam F. A strap-plate, L, is also added to steady the centre of said frame H, as seen in the fig. 3. M, fig. 2, are cultivator-shovels or ploughs. The figure represents a number arranged as a series, standing one behind the other in the position of the right-angled beam H, as shown in fig. 1. These shovels or ploughs are of peculiar construction, differing from those commonly in use by having a number of transverse openings or interstices cut through them, as seen. Fig. 5 represents the same kind of shovel having attached on the back thereof duplicate blinds N N, which are arranged so as to be moved in or out by means of slots and bolts, and so that they can be slid back to cover or shut the said openings partially or fully. Fig. 6 shows the proper form of said blinds and the location of the slots. On the outer ends of said blinds are jogs O O, as seen, the use of which will be hereafter explained. The said shovels are secured to straight standards P by bolts. The top of each is formed with a tenon fitting the slotted holes in the beam H. A screw-bolt, $P^2$, fastens each standard to the beam by passing it through a short plate, $P^3$, as seen in fig. 3. There are also slotted bands $P^4$ running across the front of the standards for the purpose of steadying them in position. $P^5$ is a separate band, so that it can be removed without displacing the others, as will be explained. A series of swivel-screw braces, Q, fig. 1, is attached to the lower front portions of each of the said standards, (the upper ends of which pass through beam F,) which serve to brace and sustain the shovels for the work. The centre standard is secured and braced by a plain brace, Q', all the others being adjustable, so as to meet the varying positions of the shovels when changed for the kind of work required. The standards J, fig. 3, which rest on the cross-tie I, have graduated holes through which a long rod, R, passes when the handles K are raised or lowered. Attached to the axle-tree F is an arrangement for raising the ploughs from off the ground in going to or from the field or when the machine is turned at the ends of the rows. It is to be used by the operator when riding. This arrangement consists of a rod, S, attached to the cross-tie I, and secured to a short chain, $S^1$, which passes over a grooved segment, $S^2$, to which is attached a lever, $S^3$, which catches into an arched rack, $S^4$, the several parts being located as seen in fig. 1. A driver-seat is also mounted on the said axle, as shown.

We will now proceed to explain the operation and several uses of our said described cultivator.

In pulverizing and mellowing the soil before sowing small grain, all the ploughs, or as many as may be needed, are to be used, first adjusting the lateral distance between each by means of the swivel-braces Q, slotted bands $P^4$, and screw-bolts $P^2$, and also adjusting the penetration of the said ploughs by the clevis E. This arrangement of the ploughs will also refer to harrowing after sowing. For cultivating and stirring the soil and killing weeds for young plants growing in hills or drills, as corn, potatoes, &c., where the rows have to be straddled, the middle plough and band $P^5$ are removed. When the machine is required for hoeing and hilling up the plants all the ploughs are to be removed and a pair provided with the blinds N N substituted, placed one on each side of the centre or angle of the beam H, as shown in fig. 4, both of which ploughs are held in position by the same bracing and bolting as adopted in the other ploughs.

The advantage gained by the use of our perforated shovels or ploughs is in the efficient manner in which the soil is broken up and pulverized, thereby rendering it finer and mellower in texture, so desirable for small-grain crops. Another advantage is that of filling, in a measure, the hollow track or wake of the plough, a portion of the soil which rises on the face of it falling through the interstices and dropping in the rear. In addition to these advantages, the transverse openings are very effectual in destroying weeds, as a great portion of them is cut or torn by being forced against the edges of the openings.

In the final hoeing and hilling of plants the openings of the ploughs, by means of the blinds N N, can be entirely or only partially closed, at the option of the operator; and it will be noticed that the jogs O O have the effect of squaring or flattening the tops of the hills as the machine travels along. It will be further noticed that the pair of ploughs will hill both sides of the straddle row and one side each of the right and left adjacent rows, so that the machine in returning takes every other row.

What we claim as our invention and desire to secure by Letters Patent, is—

1. The use and employment specially of cultivator-shovels or ploughs M, provided with perforations or open interstices made transversely across the blade or in any direction that will serve the purpose contemplated, as herein set forth.

2. The use and employment of the blinds N N, provided with slots, and with jogs O O, in combination with the above-described perforated shovels or ploughs M, and operating substantially as and for the purpose specified.

3. The use and employment of said described perforated shovels M, with and without the said described blinds N N, in combination with the slotted right-angled beam H, cross-tie I, rods G G, grooved clevis E, beam F, plough-standards $P^1$, swivel-braces Q, brace Q', slotted bands $P^4$, band $P^5$, and bolts $P^2$, all arranged, combined, and operating as and for the purposes specified.

4. The graduated standards J, plough-handles K, rod R, and joints in beam F, combined and operating as and for the purpose described.

MARSHALL HASKINS,
D. B. HART.

Witnesses:
J. F. SINGLE,
M. S. HARVEY.